Aug. 30, 1966 P. KOOPMAN 3,269,815
COATED ABRASIVE GRAIN
Filed Oct. 4, 1963

INVENTOR.
PETER KOOPMAN
BY
*Barlow & Barlow*
ATTORNEYS

United States Patent Office 3,269,815
Patented August 30, 1966

3,269,815
COATED ABRASIVE GRAIN
Peter Koopman, Lewiston, N.Y., assignor to General Abrasive Company, Inc., a corporation of New York
Filed Oct. 4, 1963, Ser. No. 313,825
6 Claims. (Cl. 51—308)

This invention relates to the surface treatment of abrasive grain to improve its properties when used.

This invention probably has its maximum utility in the coating of artificial abrasive grain such as fused aluminum oxide or silicon carbide.

An object of the invention is to promote resin adherance and increase the bonded strength between the multiplicity of particles of grain when in a bonded abrasive article when dry or after soaking in the usual lubricants used for the abrasive article.

Another object of the invention is to provide the surface of the grain with a better cutting action than the uncoated grain or a better cutting action than for a coated grain such as in Patent No. 2,527,044 which is known to me.

More specifically, an object of the invention is to provide a rougher and harder coating on the abrasive grain to accomplish the objects heretofore set fourth.

I have discovered that superior results of both bonding and cutting after bonding may be obtained by coating the abrasive grain with finely divided particles of solid materials such as carbides and nitrides and cementing these particles to the abrasive grain by a thin ceramic film such as glass which will soften at a temperature less than the softening or melting of the abrasive grain or the solid materials which are cemented to the grain.

The abrasive grain coated in this manner may be bonded in an abrasive article in such a manner as to strength the retention of the grain in the article possibly because of its increased surface area after coating and the better gripping power which it affords to the bonding material.

Also by coating the abrasive grain with a very hard plurality of particles, the cutting action of the grain is improved before it is fractured in use.

Figure 1:
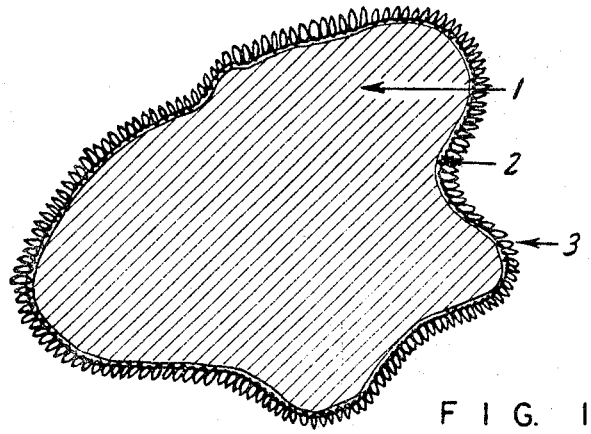
Figure 2:
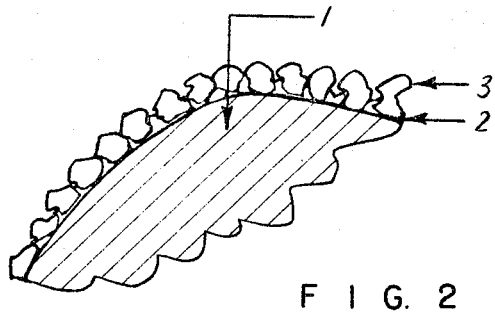

In the accompanying drawings:

FIG. 1 illustrates an abrasive grain or granule in section highly magnified and shown as coated with particles so as to illustrate the coating which is performed; and FIG. 2 is a fragmental view similar to FIG. 1 but on a much greater enlarged scale so as to show the relative position of the particles, the grain and the ceramic film which holds the two together.

With reference to this drawing, 1 designates the abrasive grain, 2 designates a film or finely divided ceramic material which has been softened sufficiently to imbed particles 3 such as a carbide or nitride in the film so as to hold these particles firmly attached to the abrasive grain. The film 2 will be of a thickness less than the particle size so that the particles will protrude outwardly and yet will be annchored by the film. The particles 3 will be of a hard substance, such as a carbide or a nitride, more particularly silicon carbide or a nitride such as silicon nitride.

The abrasive grain as here referred to is aluminum oxide or silicon carbide in grit sizes from 6 to 320 and any of these in this range of grit sizes may be coated in accordance with this invention.

The ceramic coating 2 which provides the bonding is a powdered glass frit of such a character that it will melt or soften at a temperature below the fusion point of the abrasive granules 1. It comes in a dry powdered form and is used in amounts of from .5 to 2.0% of the weight of the grain 1 to which it is to be applied. This glass bonding material which may be used varies widely and is not critical in this invention. Any one of the following examples may be used:

EXAMPLES OF GLASSES SUITABLE FOR USE IN COATING ABRASIVE GRAIN ACCORDING TO THIS SPECIFICATION

|  | 1 | 2 | 3 | 4 | 5 |
|---|---|---|---|---|---|
| $K_2O$ | 5.4 |  | 0.4 | 1.1 |  |
| $Na_2O$ | 14.7 | 10.4 | 4.8 | 2.2 | 5.46 |
| CaO | 0.5 | 20.0 | 6.0 | 7.1 |  |
| ZnO | 0.7 |  | 16.0 |  |  |
| $Al_2O_3$ | 12.1 |  | 1.0 | 8.0 | 5.44 |
| $B_2O_3$ | 16.9 | 23.3 | 10.0 | 9.0 | 12.45 |
| $SiO_2$ | 49.7 | 46.3 | 39.8 | 59.1 | 49.24 |
| F[1] | 11.8 |  |  |  |  |
| BaO |  |  | 8.0 |  | .67 |
| $CaF_2$ |  |  | 4.0 |  |  |
| $ZrO_2$ |  |  | 10.0 |  |  |
| $LiO_2$ |  |  |  | 1.7 |  |
| MgO |  |  |  | 3.3 |  |
| SrO |  |  |  | 8.5 |  |

[1] Goes off as a gas.

Some way must be provided to cause this dry, powdered frit to adhere to the grain, and in order that this may be accomplished, I provide a temporary binder which will wet the grain 1 and to which this glass powdered frit will adhere. This binder in solution is provided in amounts from 1 to 2% of the weight of the grain and conveniently may be a solution of dextrine, starch, lignin or wax emulsions. The solid part of the solution will be about 20% while the water will be substantially 80%. One such solution which may be conveniently used is borated white dextrin sold under the name of "Aqua Flakes 31" by National Starch and Chemical Corporation of Plainfield, New Jersery. This is a white, fluffy, granular powder in the dry form and is off-white in color in solution. It has a midly soapy odor and is non-inflammable. Its pH is 9.5. It dissolves quickly without lumping and has no appreciable deterioration on storage in the dry form. It is a strong film binder when dried from solution. A few drops of formaldehyde may be used in the solution to inhibit bacterial action and consequent spoilage.

This temporary binder is thoroughly mixed with the abrasive granules or grain so as to wet each of the grains with this binder. Any common mixing device may be used for this purpose such, for example, as a Hobart planetary mixer or an auger type mixer.

A glass frit which is powdered may be obtained on the market. Any of the examples above enumerated may be chosen. The softening point of these frits is well below 1600° F. which is a temperature above which the abrasive grains 1 may soften. The frit is ground to a powder so that a minimum of 95% will pass through a 200 mesh screen. No wetting agent is required with this type of frit.

After the grain has been thoroughly mixed and wetted with the temporary binder, the frit above described is introduced into the mixer and mixing continues until the frit has thoroughly adhered to the temporary binder which is on the grain.

The abrasive particles 3 which are to be added will be of a fine size of from ½ to 50 microns and will be any of the hard materials such as carbides or nitrides, such as silicon carbide or silicon nitride. Either one of these may be utilized and are used in amounts of from 1 to 2% of the weight of the grain 1 to be coated. The fine particles are added to the mix after the frit has been mixed sufficiently so that it will be adhered to the grains, and then by further mixing with these fine particles, these also become adhered to the grains so that I have the temporary binder securing the glass particles of frit and also the fine hard particles to be added to the grain adhered to the grain by this temporary binder.

After this mixing occurs, the grains are dried at approximately 200 to 300° F. for 10 to 15 minutes so as to drive off moisture which may be present.

After this drying, the grains are passed through a rotary kiln and fired for 30 to 60 minutes at from 1500 to 1600° F. in either a reducing, neutral or oxidizing atmosphere, oxidizing atmosphere being preferred. This firing burns up the temporary binder and softens the ceramic particles so that they form a film about the grain and securely adhere the carbide or nitride particles to the grain. The grain is then cooled and graded. It is preferable that air cooling be utilized, for if water cooling is utilized, then the grain must be dried after the cooling.

Example 1 may be as follows:

100 lbs. of #24 aluminum oxide grain having a grit granule of approximately 1260 microns in diameter is mixed with 1.2 lbs. of Aqua Flake solution formulated as above described until the grain is thoroughly mixed and coated, and then .8 lb. of ceramic frit Example 5 above sold as P626 by Pemco Division of the Glidden Corporation is added, and mixing is further continued until the glass frit is thoroughly mixed and coated on the grain, being adhered thereto by the temporary binder Aqua Flake. At this point 0.875 lb. of fine silicon carbide are added to the mix, the silicon carbide particles being approximately 5 microns in diameter, and further mixing occurs until the particles of silicon carbide are adhered to each of the abrasive grains. The mixture is then dried for 15 minutes at approximately 250° F. after which the grains are passed through a rotary kiln and fired for 50 minutes at 1550° F. in an oxidizing atmosphere. The glass film was approximately 2 microns thick. Thus the silicon carbide particles protrude about 3 microns beyond the grain surface.

*Example 2*

The same quantities, sizes and procedure will occur as in Example 1 except that silicon nitride particles may be substituted for the silicon carbide particles.

Some variation may be provided for different grit sizes which for convenience may be grouped as in the table as follows:

FORMULATION FOR COATING ALUMINUM OXIDE (PERCENT BY WEIGHT)

| Grit Size | 10-36 | 46 | 54-60 | 70-80 | 90-100 | 120 | 150 | 180 |
| --- | --- | --- | --- | --- | --- | --- | --- | --- |
| Al$_2$O$_3$ Grain, percent | 100 | 100 | 100 | 100 | 100 | 100 | 100 | 100 |
| A.F. Solution,[1] percent | 1.2 | 1.3 | 1.3 | 1.3 | 1.3 | 1.4 | 1.4 | 1.4 |
| Frit, percent | 0.8 | 0.9 | 0.9 | 0.9 | 0.9 | 1.0 | 1.0 | 1.0 |
| SiC or Si$_3$N$_4$ Fines (5 microns) percent | 0.875 | 0.98 | 1.57 | 1.96 | 2.35 | 3.5 | 4.37 | 5.25 |

[1] Aqua Flake Solution consists of 20% by weight Aqua Flake and 80% by weight water.

*Example 3*

100 lbs. of #24 silicon carbide grain having grit granule of approximately 1260 microns in diameter is mixed with 2 lbs. of Aqua Flake solution formulated as above described until the grain is thoroughly mixed and coated, and then 1.25 lbs. of ceramic frit Example 5 above sold as P626 by Pemco Division of the Glidden Corporation is added, and mixing is further continued until the glass frit is thoroughly mixed and coated on the grain, being adhered thereto by the temporary binder Aqua Flake. At this point 1.25 lbs. of fine silicon carbide are added to the mix, the silicon carbide particles being approximately 5 microns in diameter, and further mixing occurs until the particles of silicon carbide are adhered to each of the abrasive grains. The mixture is then dried for 15 minutes at approximately 250° F. after which the grains are passed through a rotary kiln and fired for 50 minutes at 1550° F. in an oxidizing atmosphere. The glass film was approximately 2 microns thick. Thus the silicon carbide particles protrude about 3 microns beyond the grain surface.

*Example 4*

FORMULATION FOR COATING SILICON CARBIDE (PERCENT BY WEIGHT)

| Grit Size | 10-36 | 46 | 54-60 | 70-80 | 90-100 | 120 | 150 | 180 |
| --- | --- | --- | --- | --- | --- | --- | --- | --- |
| SiC Grain, percent | 100 | 100 | 100 | 100 | 100 | 100 | 100 | 100 |
| A.F. Solution,[1] percent | 2.0 | 2.16 | 2.16 | 2.16 | 2.16 | 2.33 | 2.33 | 2.33 |
| Frit, percent | 1.25 | 1.4 | 1.4 | 1.4 | 1.4 | 1.56 | 1.56 | 1.56 |
| SiC or Si$_3$N$_4$ Fines (5 microns) percent | 1.25 | 1.40 | 2.24 | 2.80 | 3.35 | 5.0 | 6.24 | 7.50 |

[1] Aqua Flake Solution consists of 20% by weight Aqua Flake and 80% by weight water.

Glass film thickness should be the same on silicon carbide as on aluminum oxide. The apparent increased frit required on silicon carbide is due to the difference in specific gravity of silicon carbide. Being lighter, more grains are present per unit weight than would be present for aluminum oxide.

The glass film thickness would be the same on other groups of coatings where the amount of frit is increased due to the fact that finer grain size increases the surface area.

Test bars were bonded with a phenol-formaldehyde type resin commonly used in the abrasive industry and described in detail in the Kirk-Othmer Encyclopedia of Chemical Technology, volume 10, pages 335–353. The bond used contained both the liquid type and the dry or dehydrated resin. The specific blend used was Varcum Liquid 8121 (liquid phenolic resin) and, Varcum Powder Resin 1364 (powdered phenolic resin) produced by the Varcum Chemical Division of Reichhold Chemicals, Inc.

The test specimens were made from the following formulation:

|  | Percent |
| --- | --- |
| Abrasive grains (coated or uncoated) — 1800 grams | 89.58 |
| Varcum Liquid Resin 1821—38.2 grams | 1.90 |
| Varcum Powder Resin 1364—171 grams | 8.52 |

The liquid resin was added to the grain and mixed in a Hobart type mixer for 5 minutes. The wetted grain was then added to the dry or powder resin in increments and mixed for 5 minutes. The resulting mix was then screened to break up any lumps.

Based on mold of 6″ x 1″ x 1″ a weight of 232 grams of the above mix was placed in the mold, leveled, and placed in a hydraulic press to close the mold at 1″ height. This produced a bulk density of 38.66 gms./cu. in. or by ingredients, 54 volume percent abrasive, 18 volume percent bond, and 28 volume percent voids.

The specimens of (1) uncoated grain, (2) grain coated by the invention, above described, and (3) grain coated by the process of Patent No. 2,527,044 were made and compared in flexural strength on a Tinius-Olsen which has three point suspension, two on the bottom and one on the center of the top between the two bottom rests, as follows: (calculated by standard mathematical formula).

AVERAGE MODULI OF RUPTURE OF DRY TEST SPECIMEN

| Uncoated Grain, lbs./in.$^2$ | Patent No. 2,527,044 Coated Grain, lbs./in.$^2$ | Silicon Nitride Coated, lbs./in.$^2$ | Grain SiC Coated, lbs./in.$^2$ |
|---|---|---|---|
| 3,588 | 3,569 | 4,131 | 4,246 |

INCREASED MODULUS OF RUPTURE

Silicon nitride over uncoated __ 543 lbs./in. or 15.1% increase.
Silicon carbide over uncoated __ 658 lbs./in. or 18.3% increase.
Silicon nitride over Patent No. 2,527,044 _____ 562 lbs./in. or 15.7% increase.
Silcon carbide over Patent No. 2,527,044 _____ 677 lbs./in. or 18.96% increase.

The test specimens were subjected to a ten day soaking period in a grinding solution consisting of 2% soap solution. The following flexural strengths were obtained:

AVERAGE MODULI OF RUPTURE AFTER SOAKING

| Uncoated Grain, lbs./in.$^2$ | Patent No. 2,527,044 Coated, lbs./in.$^2$ | Silicon Nitride, lbs./in.$^2$ | Silicon Carbide, lbs./in.$^2$ |
|---|---|---|---|
| 2,944 | 3,220 | 4,184 | 4,153 |

PERCENT STRENGTH RETENTION AFTER SOAKING

| 82.0 | 90.2 | 101.3 | 97.8 |
|---|---|---|---|

INCREASED MODULUS OF RUPTURE

Silicon nitride over uncoated __ 1240 lbs./in. or 42.0%.
Silicon carbide over uncoated __ 1209 lbs./in. or 41.0%.
Silicon nitride over Patent No. 2,527,044 _____ 964 lbs./in. or 29.7%.
Silicon carbide over Patent No. 2,527,044 _____ 933 lbs./in. or 28.8%.

In the drawing it will appear that the grit granule or grain 1 is approximately 500 microns in diameter, the melted glass film is approximately 2 microns thick, and the silicon carbide particles 3 are approximately 5 microns in diameter, thus the coating may add 7 microns in thickness to the grain as a total, making the grain approximately 14 microns greater in diameter than heretofore or a maximum of under 3%.

The examples above refer to resin bonded grains, but a low temperature vitrified bond may be used equally as well as the resin bond.

HIGH TEMPERATURE FRITS SUITABLE FOR HIGH TEMPERATURE VITRIFIED BOND

| | 6 | 7 |
|---|---|---|
| | Percent | Percent |
| CaO | 3.3 | |
| MgO | 16.1 | |
| Al$_2$O$_3$ | 19.6 | 14.8 |
| SiO$_2$ | 61.0 | 34.3 |
| ZnO | | 50.9 |

The advantages of the above described procedure comprise increased bonded strength over uncoated grain, or grain coated by the process of Patent No. 2,527,044, both in the dry and wet condition. The enhancement of bonded strength could not have been anticipated before these discoveries.

I claim:
1. Abrasive grain; selected from the group consisting of alumina and silicon carbide coated with a glass film having a melting point below that of the grain and finely divided particles cemented to said grain by said film, said particles being selected from the group consisting of silicon carbide, and silicon nitride.
2. The subject matter of claim 1 wherein the glass film is of a thickness less than said particles will extend outwardly of the film.
3. The subject matter of claim 1 wherein the glass film is from .5 to 2.0% of the weight of the abrasive grain before coating.
4. The subject matter of claim 1 wherein the glass film is from .5 to 2.0% of the weight of the abrasive grain before coating and the particles are present in an amount of ½ to 2% of the weight of the grain before coating.
5. The subject matter of claim 1 wherein the particles are of a size of from ½ to 50 microns.
6. The subject matter of claim 1 wherein the particles are of a size of from ½ to 50 microns and the thickness of the film is less than the size of the coating particles.

References Cited by the Examiner

UNITED STATES PATENTS

| 2,527,044 | 10/1950 | Walton et al. | 51—308 |
| 2,541,658 | 2/1951 | Masin et al. | 51—308 |
| 2,782,110 | 2/1957 | Cantrell et al. | 51—308 |
| 2,837,416 | 6/1958 | Ervin | 51—308 |
| 2,883,297 | 4/1959 | Jeitner | 51—308 |

ALEXANDER H. BRODMERKEL, *Primary Examiner.*

D. J. ARNOLD, *Assistant Examiner.*